March 12, 1957 J. F. NAYLOR ET AL 2,784,685
BAKERS' OVENS AND THE LIKE HEATING CHAMBERS
Filed Jan. 29, 1953 5 Sheets-Sheet 1

Inventor
JOSEPH FRANCIS NAYLOR
CLEMENT YORATH LEWIS
By
Attorney

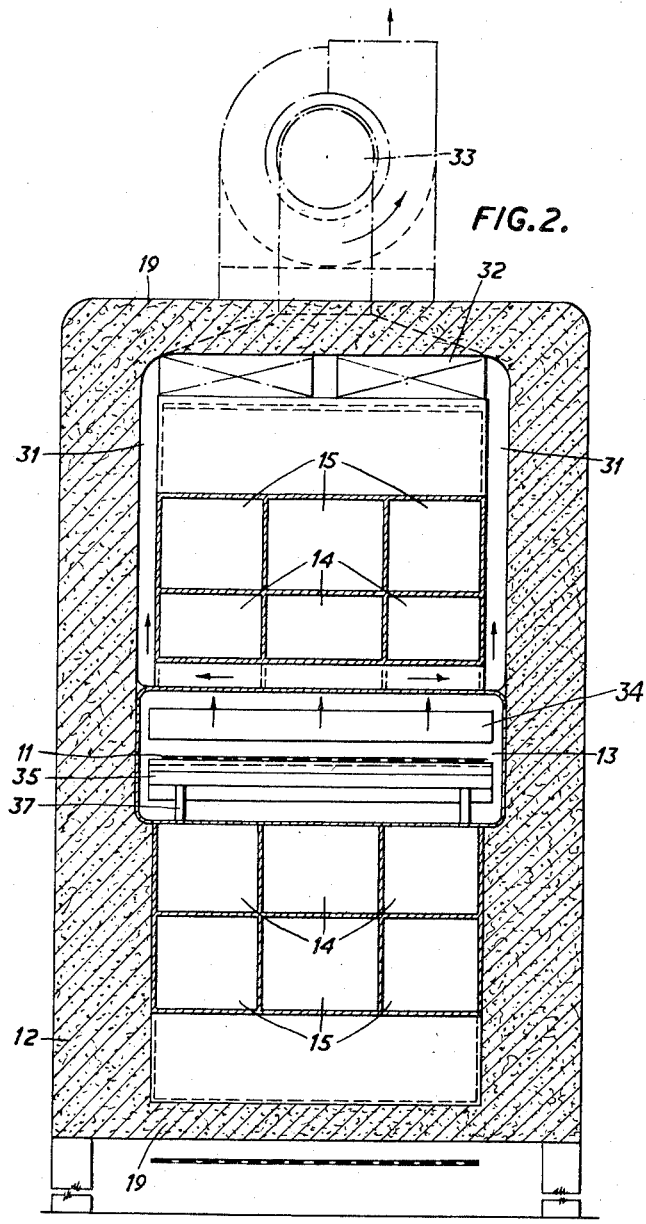

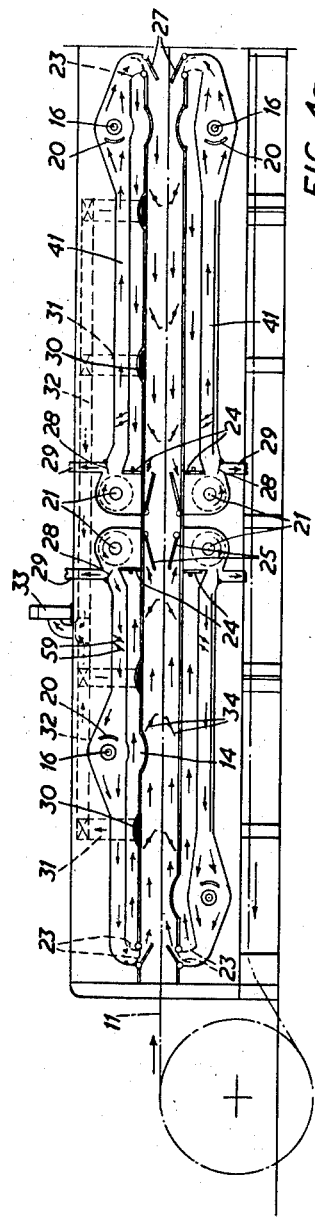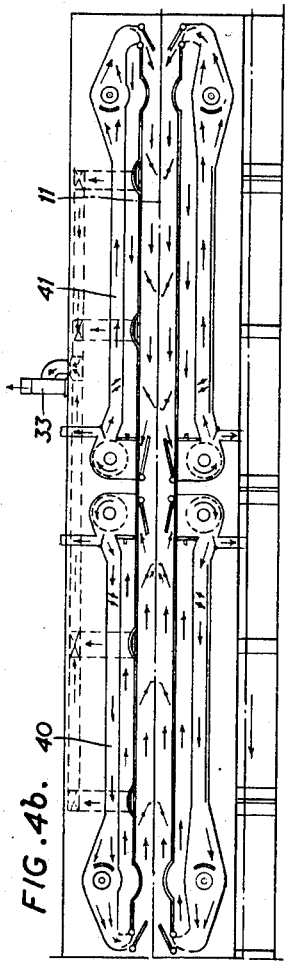

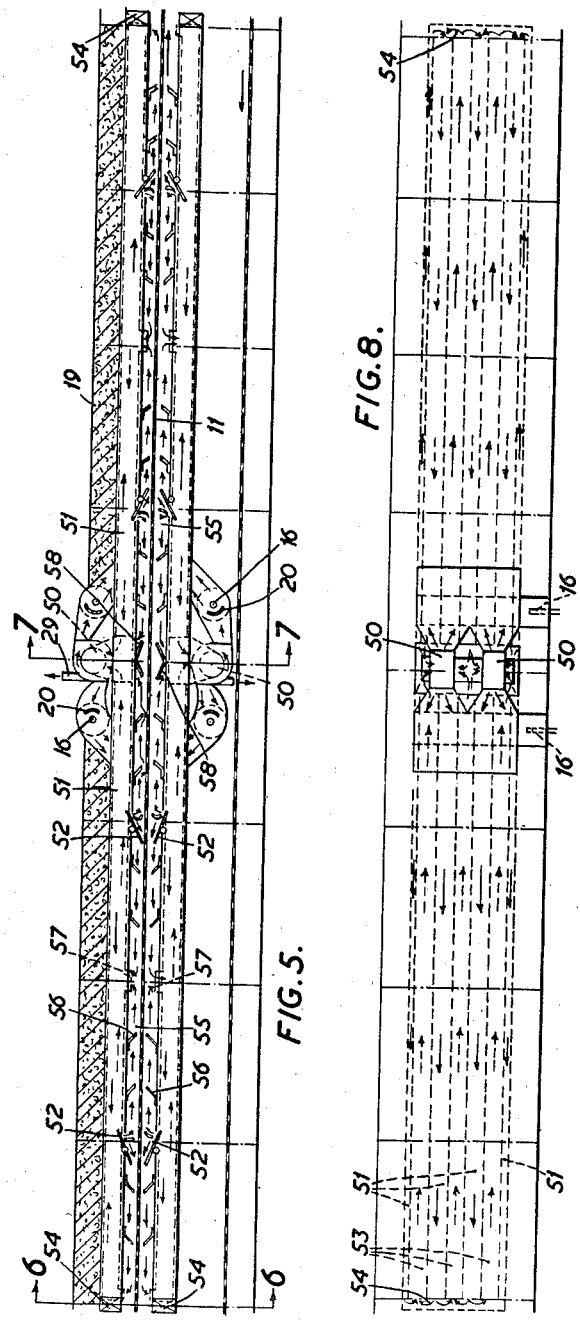

March 12, 1957　　J. F. NAYLOR ET AL　　2,784,685
BAKERS' OVENS AND THE LIKE HEATING CHAMBERS
Filed Jan. 29, 1953　　5 Sheets-Sheet 5

Inventor
JOSEPH FRANCIS NAYLOR
CLEMENT YORATH LEWIS
By
Attorney

… … …

United States Patent Office 2,784,685
Patented Mar. 12, 1957

2,784,685
BAKERS' OVENS AND THE LIKE HEATING CHAMBERS

Joseph Francis Naylor and Clement Yorath Lewis, Earlestown, Newton-le-Willows, England, assignors to T. & T. Vicars Limited, Earlestown, Newton-le-Willows, England, a British company Application January 29, 1953, Serial No. 333,932

Claims priority, application Great Britain July 15, 1952

1 Claim. (Cl. 107—57)

The present invention relates to bakers' ovens and similar heating chambers of the horizontal type and wherein material or products to be treated are subjected to baking or other heat transfer from combustion gases circulated in a substantially closed cycle.

In the manufacture of some kinds of biscuits and the like products it is necessary to ensure that, during the process of baking the products throughout their entire thicknesses, an unduly high intensity of heat is not applied in the initial stage to the biscuit surfaces since otherwise the desired rise or spring of the dough and its required texture will not be attained. For this reason it is highly desirable not only to be able to control the heating medium but also to have available the maximum degree of flexibility so as to permit variation in the intensity and concentration of the applied heat at any part of an oven or other heating chamber compatible with the nature of the product under heat treatment. Thus for example in the case of bakers' products known as crackers it is first necessary to apply heat for the purpose of achieving the required spring, then a quick penetrative heat is required to ensure that the products are set in the sprung condition and are baked throughout, particularly at their centres, while subsequently concentration of heat is required to apply the desired colour or bloom to the surfaces of the products.

The primary object of the present invention is to achieve these beneficial results in a simple manner and with the minimum of control.

According to the present invention, in an oven of the type set forth, the flow of a gaseous heating medium longitudinally through the oven or a zone thereof is adapted to take alternative coterminous paths, the said medium indirectly heating the material or products in the oven or zone thereof when flowing along one path but otherwise directly heating said products by being caused to impinge upon them, and the ratio of flow along the respective paths being selectively controlled by damper, valve or the like means so that the flow along one path is substantially complementary to that along the other and in a limiting position of the control means is zero.

Direct impingement of the medium on the material or products may be effected by the use of deflector means suitably disposed in one path, while when the alternative path is open to the gaseous heating medium, the baking or other chamber or oven zone is indirectly heated, i. e. by radiation or convection heat from surfaces of plates or walls contacted by the medium flowing along said alternative path.

Conveniently the gaseous medium may flow through a vertical duct connecting a heating chamber to the baking chamber of the oven or zone, through which the products pass, in order to heat the products directly by passing the heating medium over their surfaces or by impingement thereon such as by using suitably disposed deflectors in the baking chamber; on the other hand the heating medium may be directed from said vertical duct into a radiation chamber located between the heating chamber and the baking chamber of the oven or zone, when indirect heating is desired.

The selective operation of the control damper or valve means preferably isolates one path at a time from the closed circuit, but if desired the gaseous heating medium may flow along both paths simultaneously to meet specific requirements and this applies particularly where an oven or the like baking chamber is made up of a number of sections each constituting a zone having a circulation, in closed cycle, of the medium which is independent of that of the other or each of the others. In such event products may be heated by radiation when passing through the first zone, by radiation and by direct impingement of a similar medium when travelling through a second zone, and by direct impingement alone when traversing a third zone.

Further by the present invention means are provided for varying the velocity of the gas flow in the, or each, closed cycle in order that the most economical conditions of baking or heating may prevail. Thus when heating of the products is by radiation from hot plates or walls heated by the gaseous medium, the gas flow is maintained preferably at a slower speed throughout the system than is the case when the products are subjected to the direct impingement of a high velocity gaseous medium.

When a unidirectional flow of gaseous heating medium is maintained throughout a baking or heating chamber, through which biscuits are caused to travel in order to be baked, difficulty is experienced in achieving substantial uniformity of colour or bloom on the biscuit surfaces, and particularly their leading and rear edges.

According to a further feature of the present invention the flow of gaseous heating medium in a baking or heating chamber of such kind is effected in opposite directions either through the complete length of the heating chamber or through one or more zones or sections of this.

Where the heating chamber or oven is made up of a plurality of sections or zones each having its own fan or the like means for creating the required flow of gaseous heating medium, a simple manner of effecting contra flow is to reverse one or more of the sections relatively to the other or other in which event the fans for the sections may be located at the ends thereof. The fan however may be provided with a two directional discharge into the heating chamber or oven so as to feed streams of gaseous heating medium therethrough in opposite directions, in which case the fan may either be common to two adjacent sections and located at their junction, or alternatively it may be located either at the centre or between the ends of a single section or zone in which the opposite direction of flow is effected. It will be appreciated that the opposite direction of flow may be achieved in any of the sections.

Each arrangement described herein may be adopted for applying either top or bottom heat to the products passing through the chamber; it may be duplicated where it is desired to heat the products both from above and below.

The invention is more particularly described with reference to the accompanying drawings in which:

Figure 2 is a transverse sectional elevation on the line 2—2 of Figure 1.

Figures 4a and 4b collectively comprise a diagrammatic longitudinal elevation through a modification in which in each of a pair of adjacent oven sections gaseous heating medium is caused to flow in opposite directions through the alternative paths under the influence of upper and lower fan units each containing oppositely disposed fans arranged in pairs, and wherein the entrances to the alternative paths are at the ends of the sections remote from the fan units.

Figure 5 is a corresponding diagrammatic longitudinal elevation of a further modification which has the opposite directional flow characteristic of the oven according to Figures 4a and 4b, but differs therefrom in that the gaseous heating medium is adapted to enter the baking chamber, or take the alternative path for indirectly heating the products in the baking chamber, without traversing the oven section to the end thereof remote from the power driven fan unit or units which are of the dual discharge type and are located centrally of each oven section.

Figure 6:
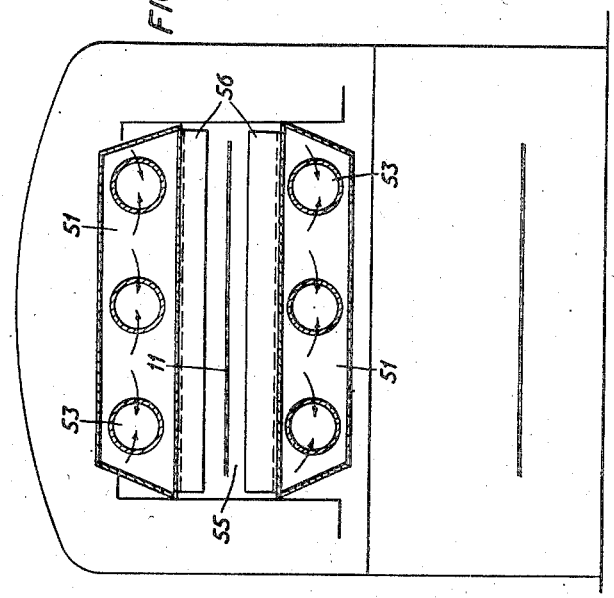

Figure 6 is a transverse sectional elevation on the line 6—6 of Figure 5.

Figure 7:
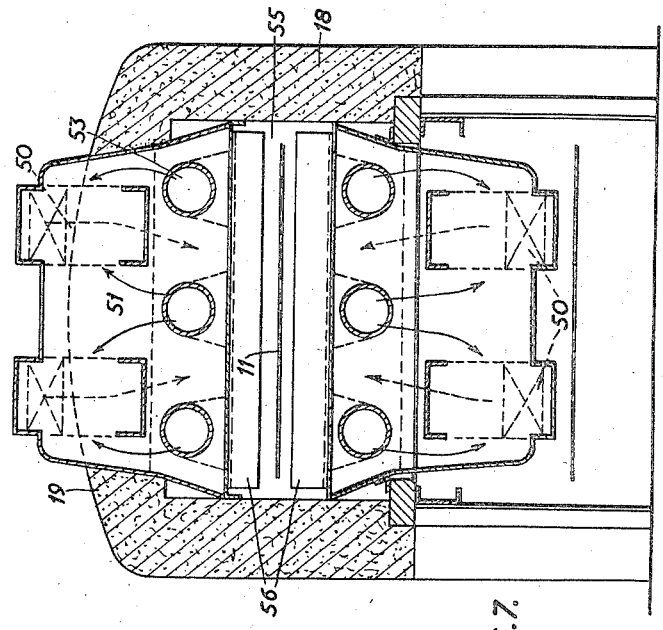

Figure 7 is a transverse sectional elevation on the line 7—7 of Figure 6.

Figure 8 is a diagrammatic plan view of Figure 5.

In the construction according to Figures 1–3 which is particularly suitable for use as an oven through which products such as biscuits or crackers 10 are carried by the upper flight 11 of a horizontal endless conveyor, each of a plurality of oven sections 12 constituting separate zones and arranged in tandem with respect to the conveyor is made up of a horizontal baking chamber 13 bounded both above and below by a series of ducts 14, which may be described as inner ducts and which in turn are bounded above and below respectively by coterminous outer ducts 5 each containing one or more heating units 16.

The base of the inner ducts 14 constituting the roof or ceiling of the baking chamber 13 and the tops of the inner ducts 14 forming the floor of the said chamber 13 have surfaces from which heat imparted to said elements is applied to the products by radiation or convection, while the outer ducts 15, which like the inner ducts preferably extend laterally as a unit over the width of the baking chamber 13, form the top and base of the oven and for this purpose they may be appropriately lagged as shown at 18, 19 to ensure conservation of heat in each closed cycle. Further the depth of each of said ducts 15 is enlarged where the heating unit or units 16, such as oil or gas burners extend transversely of the oven section, while a shield 20 is provided between each of said burners and the oncoming gaseous medium the direction of flow of which is shown by the arrows, such as for example in the manner described in the specification of Patent No. 2,651,271, dated September 8, 1953.

One or more fan units made up of coaxial fans 21 are disposed in each closed cycle system preferably at the end of a section, to create the required flow of gaseous heating medium from a fan chamber 22 thence longitudinally of the section through the outer ducts 15 housing the burners 16, until the remote end of the section 12 is reached whereupon the flow is in the reverse direction either through the inner ducts 14 or through the baking chamber 13 or both, in accordance with a selective control 23, and finally back into the fan chamber 22 under the control of additional dampers or valves 24, 25, respectively for subsequent recirculation.

Figure 1:
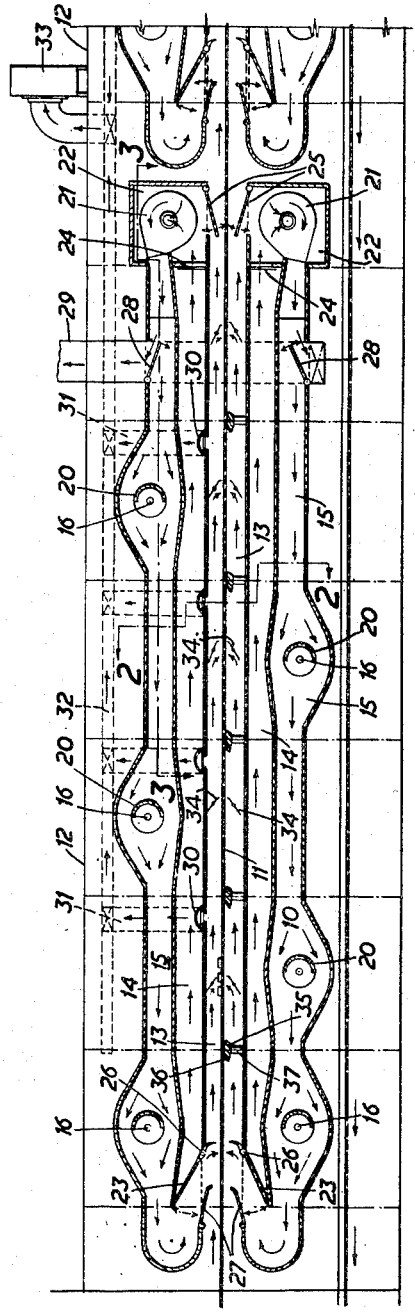
Figure 1 is a longitudinal sectional view through one section of a horizontal oven in which the gaseous heating medium flows in one direction only through coterminous alternative paths namely in the same direction as that of the travel of biscuits or other products through the oven section.
Figure 3:
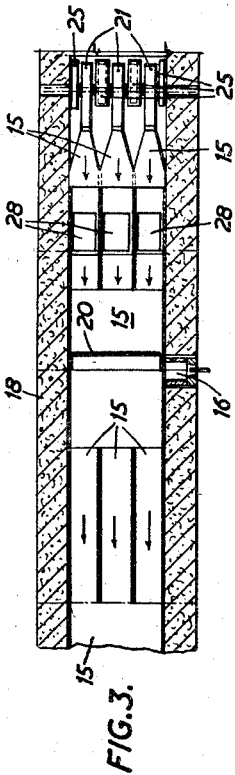
Figure 3 is a sectional plan on the line 3—3 of Figure 1.

Each selective control 23 in the construction illustrated is located in a region where flow of the heating medium is reversed, and comprises a damper plate pivotally mounted at 26 on the wall separating a duct 14 from the baking chamber 13 and projecting in one end position of adjustment into sealing engagement with the wall common to the inner and outer ducts 14, 15. An auxiliary damper 27 is conveniently provided to vary the cross section of the opening for the flow of the gaseous heating medium into the baking chamber from an outer heating duct 15 or series thereof into the baking chamber when the damper 23 constituting the selective control lies in that position consistent with complete closure of the inner duct 14 or series of ducts.

Where upper and lower fan chambers 22 are provided adjacent the end of an oven section 12 as shown in Figures 1 and 3 each damper 25, between the baking chamber 13 and a fan chamber 22, has the additional function of partially closing the baking chamber from atmosphere in that it may be adjusted so as to clear by a very small margin either the tops of the products 10 as they emerge from the baking chamber 13, or the under face of the product carrying flight 11 of the conveyor as the case may be. The damper 25 controlling the flow of gaseous medium between baking and fan chambers is preferably closed when heating is by radiation or convection alone, in which event the degree of opening of the damper 24 between an inner duct 14 or series thereof and a fan chamber 22 may be utilised to control the velocity of the gaseous medium through the system in preference of manual adjustment of the power supply to the fan unit.

Still further dampers 28 conveniently are provided for the exhaust of gases as desired from the outer ducts 15 to atmosphere through a spillway 29, this gas spill preferably being included in each system whether it be for applying top or bottom heat to the products.

A plurality of outlets 30 are provided having their inlet ends adjacent the roof of the baking chamber 13, the primary function of said outlets being to enable steam, generated during the process of baking by radiation, to be exhausted to atmosphere through ducts 31, 32 under the control of an exhaust fan 33.

Throughout the length of each baking chamber longitudinally spaced deflectors 34 are pivotally and adjustably mounted on the side walls of the chamber to take up inclined positions in the paths of the gaseous heating medium, their function being to ensure that when they are adjusted to the inclined positions illustrated in the drawings, the medium is positively directed against the products 10 in the region of each deflector as the said gaseous heating medium travels through the oven chamber 13.

It is preferred that top heat shall be applied to the products independently of bottom heat, that is to say each shall be effected in independent closed cycles having separate fan units 21 for controlling the flow of gaseous heating medium.

Where each oven section is of a length such that it is desirable to support the load carrying flight 11 of the conveyor between the ends of the section, this is effected in such manner that interference with the longitudinal flow of bottom heat medium through the baking chamber 13 is maintained at a minimum. Thus the conveyor 11 conveniently supported by longitudinally spaced and laterally extending beams 35 having curved upper faces 36 over which the conveyor 11 passes in surface contact, each of said beams 35 in turn being supported by laterally spaced pillars 37 presenting relatively narrow faces to the flow of the medium.

In operation power is supplied to the fan unit or units 21 of any oven section 12 to drive it or them at a predetermined speed compatible with efficient heating by direct impingement of the gaseous medium on the products 10 passing through that section, while the dampers 23 constituting the selective controls for top and bottom heat are maintained in positions closing the upper and lower inner ducts 14 or series thereof and the dampers 24, 25 between the inner ducts 14 and the fan chambers 22 and between the baking chamber 13 and the fan chambers 22 are respectively closed and opened. If it is desired in any section 12 to heat the products by radiation or convection the positions of the dampers 23 are reversed and under many conditions of use this will not involve adjustment of the power supply to the fans. Should both forms of heat be desired in any section all the dampers 23, 24, 25 will be maintained open to a variable extent to meet specific requirements.

In the construction illustrated in Figures 4a, 4b, the fan units are disposed between the ends of each oven section and include fans which operate to direct the flow of gaseous heating medium in opposite directions. Thus one fan or series of coaxial fans 21 causes flow in a direction from right to left along an outer series of ducts 40, which collectively cover the entire width of the oven in a manner similar to that of the ducts 15, while the opposite fan or series of fans similarly causes flow of gaseous heating medium from left to right, or right to left, respectively, along a similar outer series of ducts 41. At the outer end of each series of ducts 40, 41 the selective control 23 is operated as in the construction according to Figure 1. Thus in the result this form of construction differs primarily from that of the first in that arrangements are made for the gaseous heating medium to flow alternately in opposite directions within the baking chamber of the oven sections as is shown by the arrows.

The example illustrated in Figures 5–8 differs from that of the other two in that dual discharge fan units 50 are provided between the ends of an oven section and feed the gaseous medium to burner units 16, 20 from whence the heated medium is immediately passed into outer ducts 51, which function in a manner similar to the ducts 14, and where desired to the baking chamber at any one of a number of inlets 52 controlled by dampers which are manually angularly displaceable from a position externally of the oven. The ducts 51 house return pipes 53 with which they communicate at the ends of an oven section as shown at 54 and by the arrows in Figure 6. Thus that portion of the gaseous heating medium which reaches the end of a duct 51 remote from a fan 50 returns to the fan through the return pipes 53. Similarly the baking chamber at the end of a zone remote from the fan 50 communicates with the inlet ends of the return pipes 53.

In this arrangement the baking chamber is shown at 55 and on its roof and base are mounted fixed deflector plates 56 which constitute modifications of the pivotal deflectors of Figure 1.

Dampers 57 of any known form are also provided at spaced positions in the baking chamber 55. These dampers may function as exhausts for part of the gaseous heating medium passing through the chamber when the inlets 52 are open to said medium, and also as extractors for steam generated in the chamber. Their primary function however is to operate when the inlets 52 are closed and baking is effected by indirect heat from the ducts 51 alone, in which case they serve solely to extract the steam generated during baking in the chamber. For this purpose therefore they operate similarly to the outlets 30 of Figure 1.

It will be seen that when heating is effected indirectly by the passage of the gaseous medium along the ducts 51 and thence back to the dual discharge fans 50 through the enclosed pipes 53 the inlets 52 are maintained wholly closed. Direct heating over pre-selected zones of each oven section is effected by opening of the appropriate inlets 52 to create a flow shown by the arrows in the baking chamber, and with the medium brought by the deflectors 56 into direct contact with the products to be baked. It will also be seen that, by the disposition of the various outlets from each baking chamber 55 including outlets 58 immediately adjacent the fan unit, a flow of heated gaseous medium in direct contact with the products over the entire length of a baking chamber may be effected.

It is not proposed in this particular form of construction to operate solely by way of direct impingement of the gaseous heating medium on the products, that is to say at all times some proportion of the total heating effort is effected by radiation or convection.

By appropriately interconnecting the ducts 51 and the return pipes 53 however or by the inclusion of damper or other control means at the inlet end of each of the ducts 51, such indirect heating could be reduced should it be desired to bake mainly by the impingement of the heating medium directly upon the products.

Although shown only in Figures 4a, 4b, balancing dampers similar to dampers 59 may be provided in each of the constructions to control the relative volumes of gaseous medium passing through the various ducts which collectively make up the complete oven width.

Thus in a construction such as that of Figure 3, three balancing dampers similar to dampers 59 would be provided with the damper of the centre duct in the rear of a pair of coaxial dampers for the side ducts, to present the appearance of two dampers as shown in Figure 4a.

It will be appreciated that in each of the constructions described and illustrated, the dampers, deflectors and other controls may be manually adjustable entirely at the will of the operator from positions externally of the oven.

What we claim is:

A baker's oven comprising a baking chamber having at least one baking zone, means for conveying the products to be baked horizontally through said chamber, horizontal radiator ducts forming longitudinal boundaries for said chamber over its entire width, fan means communicating with said ducts for creating a substantially closed path of circulation of gaseous heating medium through said radiator ducts coterminous with an entire oven zone to heat indirectly said products passing through said zone, means for heating said medium, damper means for selectively diverting said gaseous heating medium from said substantially closed path into said chamber over a horizontal path which is also coterminous with said entire oven zone in order to be able to heat said products over the length of said zone, additional damper means for redirecting said diverted gaseous heating medium back into its substantially closed path, and longitudinally and horizontally spaced deflectors within said chamber and spaced from said conveyor for causing said gaseous heating medium to take a zig-zag path and thus apply turbulence to said gaseous heating medium positively to direct it against the products passing horizontally on said conveyor through said chamber.

References Cited in the file of this patent

UNITED STATES PATENTS

| | | |
|---|---|---|
| 1,664,443 | Williams et al. | Apr. 3, 1928 |
| 1,999,503 | Houlis | Apr. 30, 1935 |
| 2,224,634 | Holtzman et al. | Dec. 10, 1940 |
| 2,593,273 | Crosland | Apr. 15, 1952 |
| 2,604,059 | Warrington | July 22, 1952 |
| 2,677,336 | Spooner | May 4, 1954 |
| 2,703,539 | Cook | Mar. 8, 1955 |

FOREIGN PATENTS

| | | |
|---|---|---|
| 197,846 | Great Britain | May 24, 1923 |